(12) United States Patent
Kondo et al.

(10) Patent No.: US 7,614,603 B2
(45) Date of Patent: Nov. 10, 2009

(54) SOLENOID VALVE

(75) Inventors: Jiro Kondo, Kariya (JP); Yasuhiro Shimura, Kariya (JP); Mitomu Mohri, Kariya (JP)

(73) Assignee: DENSO CORPORATION, Kariya (JP)

( * ) Notice: Subject to any disclaimer, the term of this patent is extended or adjusted under 35 U.S.C. 154(b) by 245 days.

(21) Appl. No.: 11/637,752

(22) Filed: Dec. 13, 2006

(65) Prior Publication Data

US 2007/0158604 A1    Jul. 12, 2007

(30) Foreign Application Priority Data

Jan. 6, 2006    (JP) ............... 2006-001828

(51) Int. Cl.
*F16K 31/02* (2006.01)
(52) U.S. Cl. ................... 251/129.15; 335/297
(58) Field of Classification Search ............ 251/129.15; 335/296, 297
See application file for complete search history.

(56) References Cited

U.S. PATENT DOCUMENTS

| 6,113,066 | A | * | 9/2000 | Hohl et al. ............. 251/129.02 |
| 6,705,589 | B2 | * | 3/2004 | Hofmann et al. ....... 251/129.15 |
| 7,150,447 | B2 | | 12/2006 | Kondo |
| 2004/0135658 | A1 | * | 7/2004 | Ermert et al. ............. 335/220 |
| 2005/0062005 | A1 | | 3/2005 | Shimura et al. |
| 2006/0071560 | A1 | | 4/2006 | Ermert et al. |

FOREIGN PATENT DOCUMENTS

| JP | 2000-220762 | 8/2000 |
| JP | 2001-187979 | 7/2001 |
| JP | 2002-013662 | 1/2002 |
| JP | 2004-301294 | 10/2004 |

OTHER PUBLICATIONS

Korean Notice of Invitation to Submit Opinion dated May 26, 2008 issued in corresponding Korean Appln. No. 10 2007 0001316 with English translation.
Office Action dated Jan. 4, 2008 in DE application No. 10 2007 001 187.5 with English translation.
Chinese Office Action dated Oct. 24, 2008 issued in corresponding Chinese Application No. 200710001807.7 with English Translation.
Korean Office Action dated Jan. 21, 2009 issued in corresponding Korean Application No. 10-2007-0001316, with English translation.
Korean Office Action dated Aug. 10, 2009, issued in counterpart Korean Application No. 10-2007-0001316, with English translation.

* cited by examiner

*Primary Examiner*—John K Fristoe, Jr.
(74) *Attorney, Agent, or Firm*—Nixon & Vanderhye, PC

(57) ABSTRACT

A solenoid valve includes: a moving core; a coil for generating magnetic force that attracts the moving core; a stator that forms a magnetic circuit in cooperation with the moving core and attracts the moving core; and a cup-shaped member disposed at the inner periphery of the stator and on the outer periphery of the moving core. The cup-shaped member reciprocatably supports the moving core, and restricts hydraulic fluid leakage from the moving core side to the outer periphery side. A collar made of a soft magnetic material, disposed so as to face a face on the stator side in the axial direction of the moving core, and forming a magnetic circuit in cooperation with the moving core and the stator.

8 Claims, 5 Drawing Sheets

SOLENOID VALVE

CROSS-REFERENCE TO RELATED APPLICATION

This application is based on Japanese Patent Application No. 2006-1828 filed on Jan. 6, 2006, the disclosure of which is incorporated herein by reference.

FIELD OF THE INVENTION

The present invention relates to a solenoid valve and, more particularly, to a technique for increasing the attracting force of a solenoid valve.

BACKGROUND OF THE INVENTION

A solenoid valve has a moving core that can move to both sides in the axial direction, a coil for generating magnetic force that attracts the moving core to one side in the axial direction, and a stator that forms a magnetic circuit in cooperation with the moving core. The stator has a cylindrical part covering the peripheral face of the moving core and an attracting part for attracting the moving core.

There is a known solenoid valve having a cup-shaped member made of a nonmagnetic material, disposed on the inner periphery of the stator, and supporting the moving core so as to be able to reciprocate (for example, JP-2001-187979A). By having the cup-shaped member, fluid can be prevented from leaking to the outside of the cup-shaped member.

In the solenoid valve, the moving core is disposed on the inside in the radial direction of the cup-shaped member. On the other hand, the attracting part of the stator is disposed on the outside in the radial direction of the cup-shaped member, so that the moving core and the attracting part of the stator do not face each other. There is consequently a problem such that the attracting force is insufficient. In particular, when the amount of movement toward the attracting part of the moving core increases and the distance in the axial direction between the moving core and the attracting part is reduced, the rate of change in magnetic flux decreases. Consequently, the attracting force further decreases.

SUMMARY OF THE INVENTION

The present invention has been achieved in consideration of the circumstances and an object of the invention is to obtain strong attracting force in a solenoid valve having a cup-shaped member for preventing fluid from being leaked.

To achieve the object, a solenoid valve of the present invention includes: a moving core that can move to both sides in the axial direction; a coil for generating magnetic force that attracts the moving core to one side in the axial direction; a stator having an attracting part, when magnetic force is generated by the coil, that forms a magnetic circuit in cooperation with the moving core and attracts the moving core. The solenoid valve further includes a cup-shaped member made of a nonmagnetic material disposed on the inner periphery of the stator and on the outer periphery of the moving core. The cup-shaped member supports the moving core so as to be able to reciprocate, and restricts leaking of fluid from the moving core side to the stator side. The solenoid valve further includes a facing member made of a soft magnetic material. The facing member is disposed so as to face an end face on the attracting part side in the axial direction of the moving core, and forms a magnetic circuit in cooperation with the moving core and the attracting part of the stator.

With the configuration, in addition to a first magnetic circuit in which current is applied from the moving core to the attracting part of the stator without passing through the facing member, a second magnetic circuit in which current is passed from the moving core to the attracting part in the stator via the facing member is formed. Thus, strong attracting force is obtained. Moreover, since the facing member is disposed so as to face the end face on the attracting part side in the axial direction of the moving core, even when the position in the axial direction of the moving core becomes closer to the attracting part, the attracting force does not decrease.

BRIEF DESCRIPTION OF THE DRAWINGS

Other objects, feature and advantages of the present invention will become more apparent from the following detailed description made with reference to the accompanying drawings, in which like parts are designated by like reference numbers and in which.

DETAILED DESCRIPTION OF THE PREFERRED EMBODIMENTS

Figure 1:
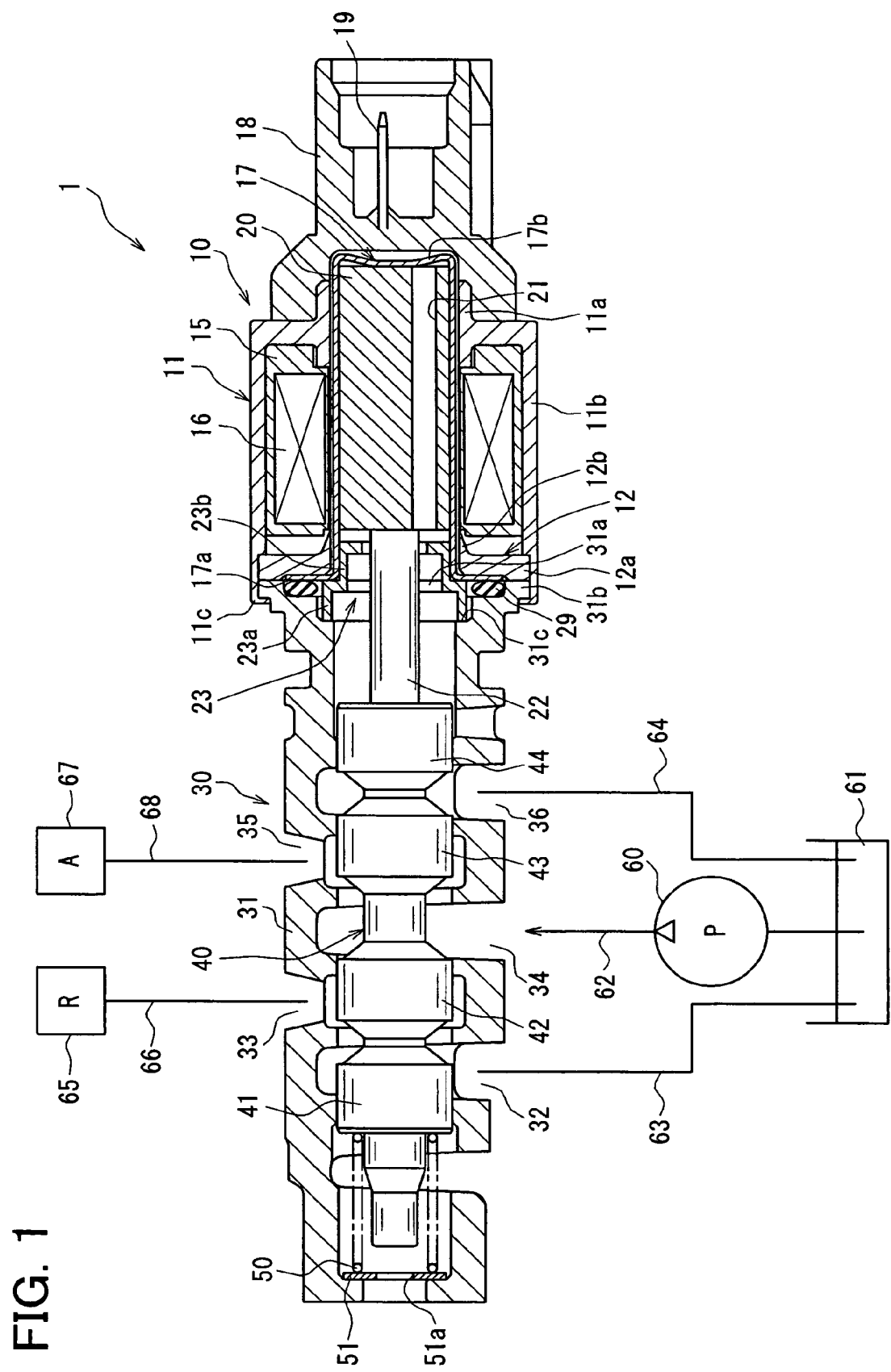
FIG. 1 is a diagram showing a first embodiment in which a solenoid valve of the present invention is applied to a hydraulic control valve in a valve timing controller in an internal combustion engine.

FIG. 1 shows a first embodiment in which a solenoid valve of the present invention is applied to a hydraulic control valve of a valve timing controller in an internal combustion engine. FIG. 1 shows a state where no current is supplied to an electromagnetic driving unit 10.

A hydraulic control valve 1 has an electromagnetic driving unit 10 for generating magnetic attracting force when current is supplied, a moving core 20, and a spool control valve 30.

The electromagnetic driving unit 10 drives the moving core 20 to one of sides in the axial direction (to the left in FIG. 1). The electromagnetic driving unit 10 has a yoke 11 as a cylindrical part of a stationary unit, a stator 12 as an attracting part of the stationary unit, a resin part 15, a coil 16 enclosed in the resin part 15, and a cup-shaped member 17.

The yoke 11 is formed by a single continuous plate member. The stator 12 and a flange 17a of the cup-shaped member 17 are sandwiched by the yoke 11 and a sleeve 31. The yoke 11, the stator 12, and the moving core 20 are made of a soft magnetic material.

The yoke 11 is fixed to a resin member 18. The yoke 11 has an inner cylindrical part 11a and an outer cylindrical part 11b. Between the inner cylindrical part 11a and the outer cylindrical part 11b, the resin part 15 and the coil 16 are enclosed. The inner cylindrical part 11a covers the outer peripheral surface of the moving core 20 and faces the moving core 20 on the outside in the radial direction of the moving core 20. The outer cylindrical part 11b extends along the outside of the coil 16 and is coupled to the stator 12. A caulking 11c is formed at an end of the outer cylindrical part 11b. By the caulking 11c, the yoke 11 and the sleeve 31 are caulked.

The stator 12 has an annular plate part 12a and a tapered projection 12b projected from the inner rim of the annular plate part 12a toward the moving core 20 in parallel with the axial direction of the moving core 20. The projection 12b is tapered to the tip. The position in the axial direction of the tip of the tapered projection 12b is near the end face of the resin part 15 confronting the stator 12.

The end of turns of the coil 16 is connected to a terminal 19 in a not-shown part, and control current is supplied from the terminal 19 to the coil 16. When the control current is supplied to the coil 16, the moving core 20 is attracted by the stator 12. Consequently, the moving core 20 moves to the left side in the drawing against the energizing force of a spring 50 in contact with a spool 40.

The moving core 20 is a columnar member in which a spill passage 21 penetrating in the axial direction is formed. The spill passage 21 is provided to spill hydraulic fluid. The outer peripheral surface of the moving core 20 slides along the inner peripheral surface of the cup-shaped member 17. On the outer peripheral surface, a film having a low coefficient of friction such as fluororesin is coated. A shaft 22 connects the spool 40 with the moving core 20.

Figure 2A:
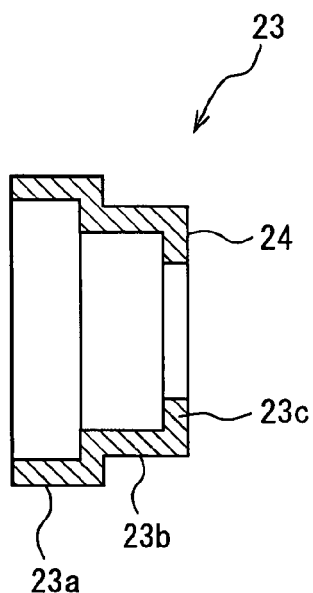
FIG. 2A is an enlarged cross section of a collar and FIG. 2B is an enlarged diagram of the collar viewed from a moving core.
Figure 2B:
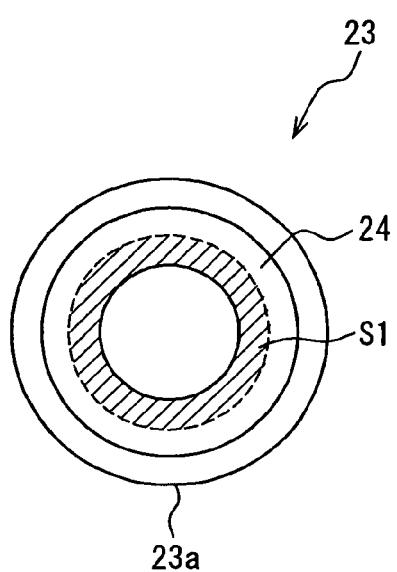

A collar 23 as a part of the stator and a facing member is disposed in an opening 31a of the sleeve 31. The shaft 22 penetrates the collar 23 in the axial direction. FIGS. 2A and 2B are enlarged views of the collar 23.

FIG. 2A is a cross section of the collar 23, which is the same section as that of FIG. 1. FIG. 2B is a front view of the collar 23 viewed from the moving core 20.

The collar 23 is made of a large-diameter cylindrical part 23a, a small-diameter cylindrical part 23b, and a facing plate part 23c and is formed from a single plate made of a soft magnetic material (for example, iron plate) by pressing or the like. The large-diameter cylindrical part 23a, small-diameter cylindrical part 23b, and facing plate part 23c share the center of axis which coincides with the axis of the moving core 20.

The inside diameter of the large-diameter cylindrical part 23a is almost the same as that of a bottom cylindrical part 17b of the cup-shaped member 17. The diameter of the small-diameter cylindrical part 23b is smaller than that of the large-diameter cylindrical part 23a. The small-diameter cylindrical part 23b is coupled to one of ends in the axial direction of the large-diameter cylindrical part 23a.

The facing plate part 23c is an annular plate and is formed at the other end of the small-diameter cylindrical part 23b so as to project from the inner peripheral surface of the small-diameter cylindrical part 23b to the inside in the radial direction. The end face on the right side in FIG. 2B of the facing plate part 23c (the end face on the moving core 20 side) is flush with the end face of the small-diameter cylindrical part 23b. By the end face of the facing plate part 23c and the end face of the small-diameter cylindrical part 23b which are flush with each other, a facing surface 24 that faces the end face of the moving core 20 is constructed. The facing surface 24 has an area almost the same as that of the end face of the moving core 20 and is almost parallel with the end face of the moving core 20.

In a case that the area of the end face constructing a part of the facing surface 24 is S1 (the area of the hatched portion in FIG. 2B), the area on the outer peripheral surface of the facing plate part 23c (the area of a coupling part with the small-diameter cylindrical part 23b) is S2, and the sectional area of the small-diameter cylindrical part 23b is S3, the relations of S1>S2 and S1>S3 are satisfied. When the radius of the outer peripheral surface of the facing plate part 23c is r1 and the thickness of the facing plate part 23c is d1, S2 is expressed as $2 \times \pi \times r1 \times d1$. Since the radius of the inner peripheral surface of the small-diameter cylindrical part 23b is r1, when the radius of the outer peripheral surface of the small-diameter cylindrical part 23b is r2, S3 is expressed as $\pi(r2^2 - r1^2)$.

Referring again to FIG. 1, the large-diameter cylindrical part 23a is disposed between the flange 17a of the cup-shaped member 17 and a retaining face 31c formed near the opening 31a of the sleeve 31, thereby determining the position in the axial direction of the collar 23. In this position, the small-diameter cylindrical part 23b is positioned on the inside in the radial direction of the stator 12. That is, the small-diameter cylindrical part 23b faces the inner face of the stator 12.

The cup-shaped member 17 is made of a nonmagnetic material such as stainless steel. The cup-shaped member 17 is disposed inside of the yoke 11 and the stator 12. In other words, the yoke 11 and the stator 12 are disposed outside of the cup-shaped member 17. The cup-shaped member 17 covers the opening 31a in the sleeve 31, and has the flange 17a and the bottomed cylindrical part 17b.

The bottomed cylindrical part 17b extends from the stator 12 to an opposite end of the yoke 11 relative to the stator 12. The bottom portion of the bottomed cylindrical part 17b covers a bottom end of the moving core 20 facing the resin member 18. Therefore, the hydraulic fluid leaked from the spool control valve 30 toward the moving core 20 can be prevented from being leaked to the outside of the cup-shaped member 17, for example, to the side of the coil 16.

The flange 17a of the cup-shaped member 17 is sandwiched by the annular plate part 12a of the stator 12 and the flange 31b of the sleeve 31. The flange 31b of the sleeve 31 is caulked with the caulking 11c as bonding means of the yoke 11, thereby fluid-tightly coupling the flange 17a of the cup-shaped member 17 to the flange 31b of the sleeve 31.

An O-ring 29 is disposed between the flange 17a of the cup-shaped member 17 and the end of the sleeve 31 confronting the moving core 20, thereby preventing the hydraulic fluid from being leaked from the gap between the flange 17a of the cup-shaped member 17 and the flange 31b of the sleeve 31.

The spool control valve 30 has the sleeve 31 and the spool 40. The spool 40 is inserted into the sleeve 31 through the opening 31a. The spool 40 is in contact with the shaft 22 to be operated by the electromagnetic driving unit 10.

A plurality of openings 32, 33, 34, 35, and 36 through which the hydraulic fluid passes are formed in predetermined wall face positions of the sleeve 31. A pump 60 supplies the hydraulic fluid sucked from an oil tank 61 to the opening 34 via an oil passage 62. The openings 32 and 36 are open toward the oil tank 61 via the oil passages 63 and 64, respectively. The opening 33 communicates with a retard hydraulic chamber 65 via an oil passage 66, and the opening 35 communicates with an advance hydraulic chamber 67 via an oil passage 68.

The spool 40 is supported with the inner wall of the sleeve 31 slidably in the axial direction. The spool 40 is constructed by large-diameter parts 41, 42, 43, and 44 as lands each having a diameter almost the same as the inside diameter of the sleeve 31, and a small-diameter part connecting the large-diameter parts.

One end of the spring 50 is in contact with the end face of the spool 40, and the other end is in contact with a plate 51. The spring 50 biases the spool 40 to the right side in FIG. 1. The plate 51 is an annular thin plate, and a through hole 51a is formed in the center.

The case of supplying current to the coil 16 in the hydraulic control valve 1 with such a configuration will now be described. In a state where no current is supplied to the coil 16, the magnetic attracting force does not act on the moving core 20, and the spool 40 and the moving core 20 are in the positions shown in FIG. 1 by the biasing force of the spring 50.

Figure 3:
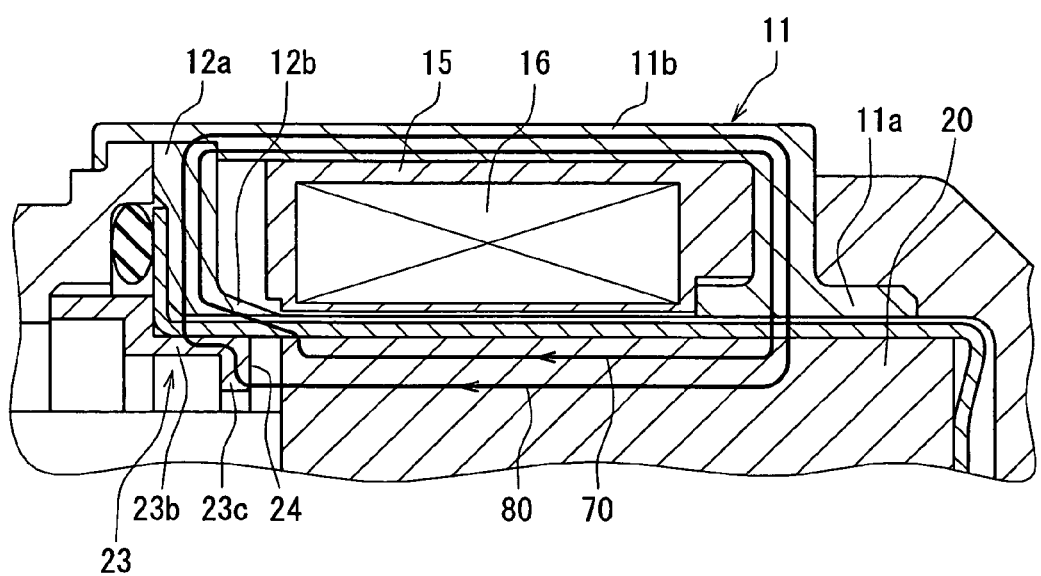
FIG. 3 is a diagram illustrating magnetic circuits in the first embodiment.

When control current is supplied to the coil 16, as shown in FIG. 3, a first magnetic circuit 70 is formed in which the magnetic flux flows from the yoke 11 and the moving core 20 to the tapered projection 12b of the stator 12 without passing through the collar 23. In addition to the first magnetic circuit 70, a second magnetic circuit 80 in which the magnetic flux flows from the yoke 11 and the moving core 20 to the stator 12 via the collar 23 is also formed. By the second magnetic circuit 80, an attraction force is generated between the end face of the moving core 20 and the facing surface 24 of the collar 23. Consequently, as compared with the case where only the first magnetic circuit 70 is formed, the attraction force increases.

Moreover, as described above, the area S2 of the coupling part with the small-diameter cylindrical part 23b of the facing plate part 23c is smaller than the area S1 of the end face, on the side on which the facing plate part 23c forms a part of the facing surface 24, of the facing plate part 23c. Consequently, when magnetic flux of high density enters the end face of the facing plate part 23c, magnetic saturation occurs in the coupling part with the small-diameter cylindrical part 23b of the facing plate part 23c.

The sectional area S3 of the small-diameter cylindrical part 23b is also smaller than the area S1 of the end face, on the side on which the facing cylindrical part 23 forms a part of the facing surface 24, of the facing plate part 23c. When magnetic flux of high density enters the end face of the facing plate part 23c, magnetic saturation occurs also in the small-diameter cylindrical part 23b. As a result, even when the moving part 20 is attracted and moved toward the stator 12 and the magnetic flux entering the facing surface 24 increases, the attracting force does not increase excessively.

Figure 4:
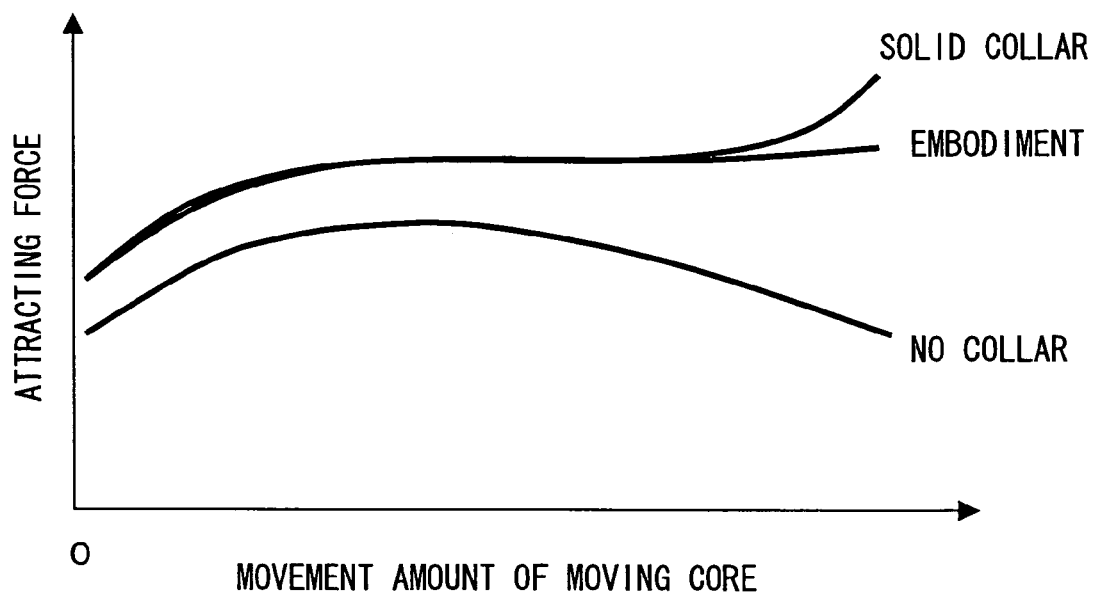
FIG. 4 is a diagram showing the relation between a movement amount of the moving core and the attracting force in the first embodiment in comparison with the case where the collar is not provided and the case where a solid collar is used.

FIG. 4 is a diagram showing the relation between the movement amount of the moving core 20 and the attracting force in the embodiment in comparison with the case where no collar 23 is provided and the case where a solid collar is used. The reference of the movement amount of the movement part 20 is the position when no current flows in the coil 16. The configuration of the case where no collar 23 is provided is obtained by eliminating the collar 23 from the hydraulic control valve 1 of the embodiment. Although the outer shape of the solid collar is the same as that of the collar 23 in the embodiment, the solid collar is made of a soft magnetic material except for the part in which the shaft 22 is inserted.

As shown in FIG. 4, the attracting forces of the configurations each having the collar are stronger than that of the configuration using no collar. The attracting force of the configuration using no collar drops as the movement amount of the moving part 20 increases. On the other hand, the attracting forces of the configurations each using the collar do not drop even when the movement amount increases for the reason that the second magnetic circuit 80 is formed.

The attracting force in the configuration using the solid collar increases in the portion in which the movement amount is the largest. That is, in the portion in which the rate of change of the magnetic flux supplied from the moving part 20 to the collar increases when the moving part 20 and the collar come close to each other. The increase in the attracting force is unpreferable since an impact when the moving part 20 collides with the collar is too large. On the other hand, in the embodiment, the collar 23 has the shape in which magnetic saturation occurs as described above, so that such an increase in the attracting force is not seen.

Figure 5:
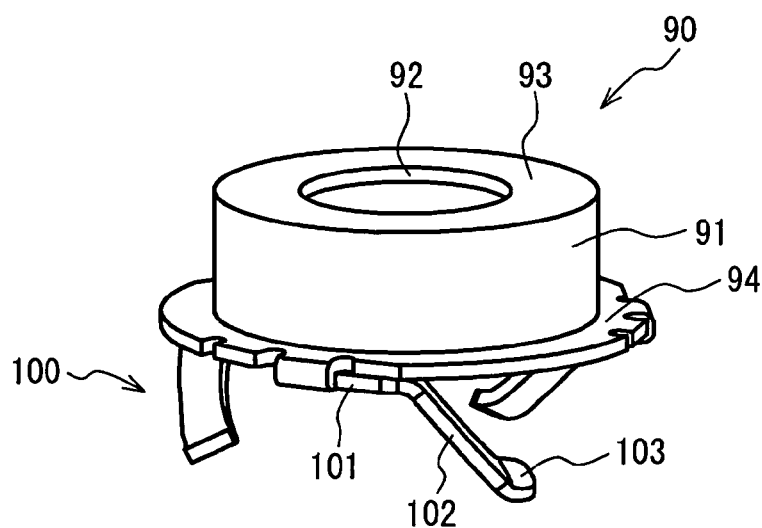
FIG. 5 is a perspective view showing a collar in a second embodiment.
Figure 6:
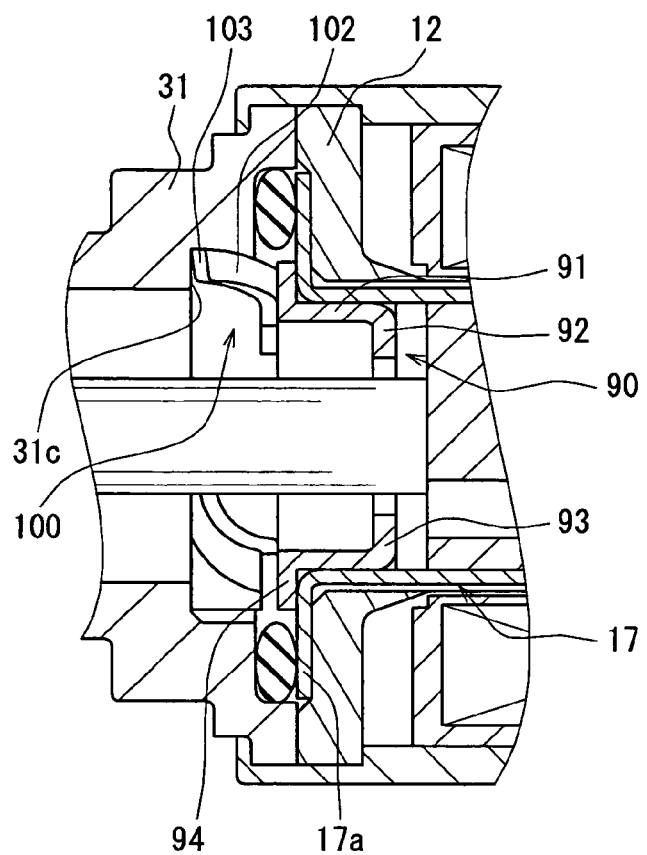
FIG. 6 is a cross section of a portion of the collar of a hydraulic control valve in the second embodiment.

A second embodiment of the invention will now be described. The second embodiment is different from the first embodiment only with respect to the point that a collar 90 shown in FIG. 5 is used in place of the collar 23. FIG. 5 is a perspective view of the collar 90. FIG. 6 is a cross section of the portion including the collar 90 of a hydraulic control value of the second embodiment.

The collar 90 includes a cylindrical part 91 having the same shape as that of the small-diameter cylindrical part 23b of the collar 23 in the first embodiment and a facing plate part 92 having the same shape as that of the facing plate part 23c of the collar 23 in the first embodiment. A facing surface 93 is formed by the end faces (the top face in FIG. 5) of the cylindrical part 91 and the facing plate part 92.

The collar 90 also has a flange 94. The flange 94 is coupled to the cylindrical part 91 at an end opposite to the facing plate part 92, and projects from the cylindrical part 91 to the outside in the radial direction.

An elastic part 100 corresponding to the biasing member is integrated with the collar 90. A plurality of (three in the diagram) the elastic parts 100 are provided at equal intervals in the circumferential direction. The energizing part 100 has a base plate 101, a leg 102, and a contact part 103.

The base plate 101 has a band shape which is in contact with the flange 94. An end in the longitudinal direction of the base plate 101 is coupled to the outer periphery of the flange 94. The leg 102 is connected to one end in the longitudinal direction of the base plate 101. As the distance increases from the connection part to the other end, the distance in the axial direction (the distance in the vertical direction of FIG. 5) from the base plate 101 and the flange 94 increases. The contact part 103 is connected to the other end of the leg 102 and has a predetermined angle with respect to the leg 102.

The collar 90 and the biasing part 100 having such a configuration are formed from a single plate made of a soft magnetic material by pressing. The base plate 101 of the biasing part 100 is formed by bending the flange 94, and the leg 102 and the contact part 103 are also formed by bending.

As shown in FIG. 6, in a state where the collar 90 is assembled in the hydraulic control valve, the contact part 103 of the biasing part 100 is in contact with the retaining face 31c of the sleeve 31. By the biasing force of the biasing part 100, the flange 94 of the collar 90 is in contact with the flange 17a of the cup-shaped member 17. The cup-shaped member 17 is a position fixing member of which position is unchanged for the stator 12. By the contact with the cup-shaped member 17, the position in the axial direction of the collar 90 is determined. In this state, the leg 102 of the biasing part 100 is elastically-plastically deformed.

In the second embodiment, by being energized by the biasing part 100, the flange 94 of the collar 90 comes into contact with the flange 17a of the cup-shaped member 17, thereby determining the position in the axial direction of the collar 90. Therefore, variations in the distance between the collar 90 and the moving core 20 among products are reduced, so that variations in the attracting force among products can be also reduced.

Since the collar 90 and the biasing part 100 are formed integrally, the number of forming steps is decreased, and the number of assembling steps is also decreased. Assembly of the energizing member can be prevented from being forgotten.

Figure 9:
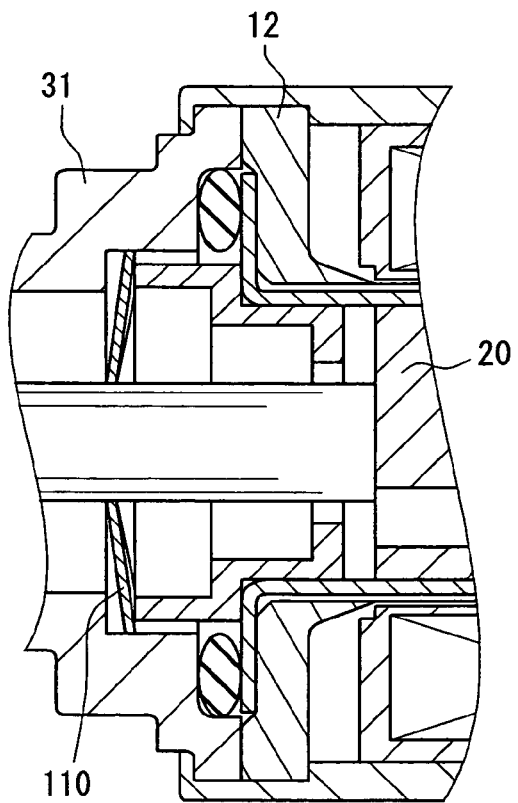
FIG. 9 is a cross section of a solenoid valve using a wave washer.

Since the biasing part 100 is integrated with the collar 90, the biasing part 100 frictionally slides only on the side of the contact part 103. Therefore, as compared with the case of using a wave washer 110 as the biasing member as shown in FIG. 9 which will be described later, aberration can be reduced for the reason that the face on which frictional sliding occurs is only one side in the axial direction.

Although the embodiments of the invention have been described above, the invention is not limited to the foregoing embodiments. The following modifications are also included in the technical scope of the present invention and the invention can be variously changed without departing from the gist.

Figure 7A:
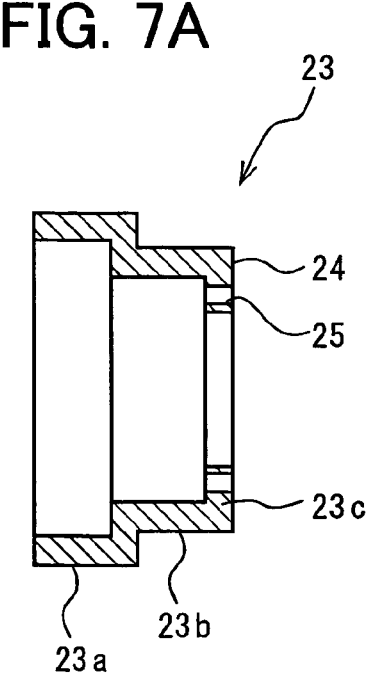
FIGS. 7A and 7B are cross section and side view, respectively, sowing a modification of a collar.
Figure 7B:
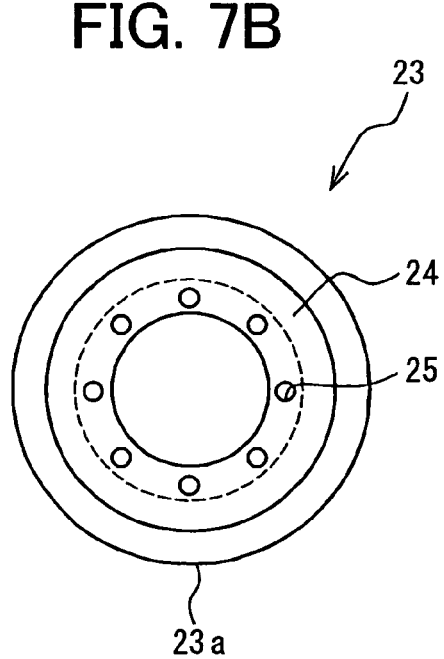

For example, as shown in FIGS. 7A and 7B, a plurality of through holes 25 penetrating in the axial direction (thickness direction) may be formed in the facing plate part 23c of the collar 23. By forming the through holes 25 in the facing plate part 23c, as compared with the case where the through holes 25 are not formed, the facing plate part 23c is more easily magnetically saturated. Even in the case where the magnetic flux transmitted toward the facing plate part 23c increases when the moving core 20 is attracted toward the stator 12 by the magnetic force, when the facing plate part 23c is magnetically saturated, the attracting force can be prevented from being excessively increased.

Figure 8A:
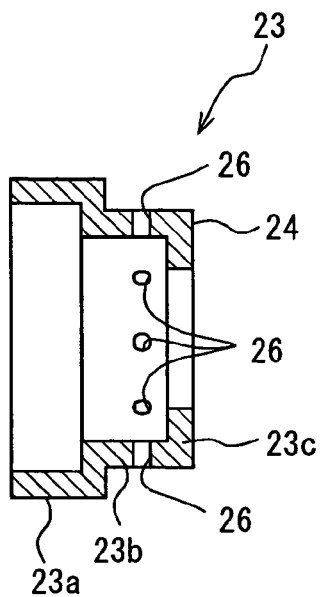
FIGS. 8A and 8B are cross section and side view, respectively, showing another modification of a collar.
Figure 8B:
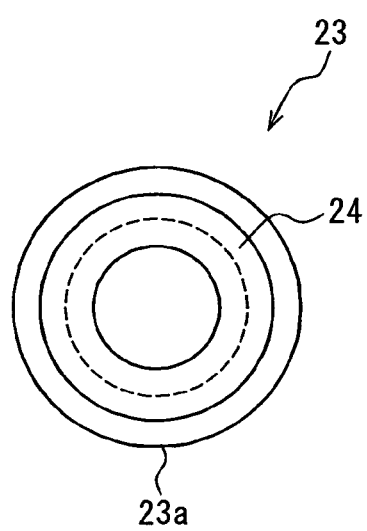

As shown in FIGS. 8A and 8B, a plurality of through holes 26 penetrating in the radial direction (thickness direction) may be formed in the small-diameter cylindrical part 23b of the collar 23. With such a configuration, as compared with the case where the through holes 26 are not formed, the small-diameter cylindrical part 23b is more easily magnetically saturated. Even in the case where the magnetic flux traveling toward the small-diameter cylindrical part 23b increases when the moving core 20 is attracted toward the stator 12 by the magnetic force, if the facing plate part 23b is magnetically saturated, the attracting force can be prevented from being excessively increased. The through holes 25 and 26 may be formed in both of the small-diameter cylindrical part 23b and the facing plate part 23c.

Although the biasing part 100 integrated with the collar 90 is provided as the biasing member in the foregoing second embodiment, as shown in FIG. 9, the wave washer 110 may be used as the biasing member.

Although the biasing part 100 is integrally formed with the collar 90 from a single plate in the foregoing second embodiment, it is also possible to manufacture the collar 90 and integrate a predetermined biasing member with the collar 90 by welding, bonding, or the like.

What is claimed is:

1. A solenoid valve comprising:
   a moving core moving in an axial direction;
   a coil for generating magnetic force that attracts the moving core to one side in the axial direction;
   a stator having an attracting part, forming a first magnetic circuit in cooperation with the moving core, and attracting the moving core when magnetic force is generated by the coil;
   a cup-shaped member made of a nonmagnetic material, disposed at an inner periphery of the stator and on an outer periphery of the moving core, the cup-shaped member reciprocatably supporting the moving core and restricting a fluid leakage in a direction from the moving core to the stator side, and
   a facing member made of a soft magnetic material and formed independently of the stator, said facing member being disposed in such a manner as to face an end face of the moving core confronting to the attracting part, and forming a second magnetic circuit in cooperation with the moving core and the attracting part of the stator, the second magnetic circuit being generated through the moving core, the facing member, the cup-shaped member, and the stator, wherein
   the facing member has a flange which comes into contact with a position fixing member of which position is unchanged with respect to the stator, and
   a biasing member for biasing the flange toward the position fixing member.

2. The solenoid valve according to claim 1, wherein the biasing member is integrated with the facing member.

3. The solenoid valve according to claim 2, wherein the biasing member is made of the same soft magnetic material as that of the facing member.

4. The solenoid valve according to claim 3, wherein the biasing member is elastic plastic deformed to thereby the facing member is biased toward the position fixing member.

5. A solenoid valve comprising:
   a moving core moving in an axial direction;
   a coil for generating magnetic force that attracts the moving core to one side in the axial direction;
   a stator having an attracting part, forming a magnetic circuit in cooperation with the moving core, and attracting the moving core when magnetic force is generated by the coil;
   a cup-shaped member disposed at an inner periphery of the stator and on an outer periphery of the moving core, the cup-shaped member reciprocatably supporting the moving core and restricting a fluid leakage in a direction from the moving core to the stator side, and
   a facing member made of a soft magnetic material, disposed in such a manner as to face an end face of the moving core confronting to the attracting part, and forming a magnetic circuit in cooperation with the moving core and the attracting part of the stator, wherein
   the facing member has a flange which comes into contact with a position fixing member of which position is unchanged with respect to the stator; and
   a biasing member for biasing the flange toward the position fixing member.

6. The solenoid valve according to claim 5, wherein the biasing member is integrated with the facing member.

7. The solenoid valve according to claim 6, wherein the biasing member is made of the same soft magnetic material as that of the facing member.

8. The solenoid valve according to claim 7, wherein the biasing member is elastic plastic deformed to thereby the facing member is biased toward the position fixing member.

* * * * *